US006978218B1

(12) United States Patent
Kolb et al.

(10) Patent No.: US 6,978,218 B1
(45) Date of Patent: *Dec. 20, 2005

(54) SYSTEM AND METHOD FOR TESTING APPLICATIONS AT THE PRESENTATION LAYER

(75) Inventors: Martin Kolb, Hambruecken (DE); Stefan Beck, Leimen (DE)

(73) Assignee: SAP AG, Walldorf (DE)

( * ) Notice: Subject to any disclaimer, the term of this patent is extended or adjusted under 35 U.S.C. 154(b) by 93 days.

This patent is subject to a terminal disclaimer.

(21) Appl. No.: 10/685,170

(22) Filed: Oct. 13, 2003

(51) Int. Cl.[7] .............................................. G06F 19/00
(52) U.S. Cl. ...................... 702/122; 702/121; 702/123; 702/182; 717/115; 717/124; 714/38; 714/47
(58) Field of Search ................................. 702/108, 121, 702/122, 123, 182, 186; 717/115, 124, 135; 714/38, 47

(56) References Cited

U.S. PATENT DOCUMENTS 6,002,992 A * 12/1999 Pauwels et al. ............. 702/123
6,279,124 B1 * 8/2001 Brouwer et al. .............. 714/38
6,763,343 B1 * 7/2004 Brooke et al. ................ 707/1

OTHER PUBLICATIONS

W3C, "XML Schema Part 2: Datatypes Second Edition" W3C Recommendation Oct. 28, 2004, pp. 1-154, printed on Apr. 26, 2005, www.w3.org/TR/xmlscheme-2.
W3C, XML Schema, pp. 1-18, printed on Arp. 26, 2005, www.w3.org/XML/Schema.

* cited by examiner

Primary Examiner—Bryan Bui
(74) Attorney, Agent, or Firm—Blakely, Sokoloff, Taylor & Zafman, LLP

(57) ABSTRACT

A system and method for testing application program code within the presentation layer of an application server. A user interface is provided for entering data and triggering one or more actions to process the data; the data and/or actions are translated to a presentation layer format; results of the data and/or actions are received in a presentation layer format; and the entered data, actions and/or results are stored in the presentation layer format within a test script, the test script usable to test an instance of an application at the presentation layer of the application.

30 Claims, 12 Drawing Sheets

Mapping of Data From GUI Data
Elements to Presentation Data Elements

Fig. 8

SYSTEM AND METHOD FOR TESTING APPLICATIONS AT THE PRESENTATION LAYER

BACKGROUND

1. Field of the Invention

This invention relates generally to the field of data processing systems. More particularly, the invention relates to a system and method for testing program code.

2. Description of the Related Art

Traditional client-server systems employ a two-tiered architecture such as that illustrated in FIG. 1a. Applications 102 executed on the client side 100 of the two-tiered architecture are comprised of a monolithic set of program code including a graphical user interface component, presentation logic, business logic and a network interface that enables the client 100 to communicate over a network 103 with one or more servers 101. A database 104 maintained on the server 101 provides non-volatile storage for the data accessed and/or processed by the application 102.

As is known in the art, the "business logic" component of the application represents the core of the application, i.e., the rules governing the underlying business process (or other functionality) provided by the application. The "presentation logic" describes the specific manner in which the results of the business logic are formatted for display on the user interface. The "database" 104 includes data access logic used by the business logic to store and retrieve data.

The limitations of the two-tiered architecture illustrated in FIG. 1a become apparent when employed within a large enterprise. For example, installing and maintaining up-to-date client-side applications on a large number of different clients is a difficult task, even with the aid of automated administration tools. Moreover, a tight coupling of business logic, presentation logic and the user interface logic makes the client-side code very brittle. Changing the client-side user interface of such applications is extremely hard without breaking the business logic, and vice versa. This problem is aggravated by the fact that, in a dynamic enterprise environment, the business logic may be changed frequently in response to changing business rules. Accordingly, the two-tiered architecture is an inefficient solution for enterprise systems.

In response to limitations associated with the two-tiered client-server architecture, a multi-tiered architecture has been developed, as illustrated in FIG. 1b. In the multi-tiered system, the presentation logic 121 and/or business logic 122 are logically separated from the user interface 120 of the application. These layers are moved off of the client 125 to one or more dedicated servers 126 on the network 103. For example, the presentation logic 121 and the business logic 122 may each be maintained on separate servers.

This separation of logic components and the user interface provides a more flexible and scalable architecture compared to that provided by the two-tier model. For example, the separation ensures that all clients 125 share a single implementation of business logic 122. If business rules change, changing the current implementation of business logic 122 to a new version does not require updating any client-side program code. In addition, presentation logic 121 may be provided which generates code for a variety of different user interfaces 120 (e.g., standard browsers such as Internet Explorer® or Netscape Navigator®).

To ensure proper operation, applications are generally tested before they are deployed within an enterprise network. As illustrated in FIG. 1c, in current testing environments, testing of the application occurs at the user interface level 120. In one approach to testing, inputs are supplied to the user interface 120 during execution to establish what the predicted proper outputs should be. User interface elements are typically identified via a technical ID or a textual label associated with the elements and the representation of entered data may be based on, for example, value changes of entry fields. The inputs and outputs are recorded in a test script 108 by a test control program 106. Using the recorded outputs, the test script 108 may then be used to test another instance of the user interface 120 by applying the same inputs to the user interface 120 and comparing the resultant outputs to the previously-recorded outputs.

There are a variety of problems associated with the foregoing approach. First, test scripts based on the user interface will most likely break when the user interface has been changed. Given the fact that user interfaces tend to change very frequently, test scripts based on the user interface must frequently be rewritten. Moreover, applications using client-server technology often have more than one type of user interface type for accessing the presentation/business logic, thereby requiring several testing technologies and several test cases for each user interface. For example, browser-based user interfaces are different for every browser type and every browser version (e.g., Netscape 4, Netscape 6, Internet Explorer 5, Internet Explorer 6, . . . etc). Test scripts that were created using one specific browser type/version may only work with that specific browser type/version. In addition, test scripts that were generated from user interface information are not particularly human readable because they deal with user interface identifiers and other technical user interface elements (e.g., text fields, drop down menu items, . . . etc). Finally, during execution of the test script, the user interface must be executed on the client so that the scripted actions can be replayed. With this restriction it is not possible to create load tests that simulate hundreds of users because this would require hundreds of client applications running at the same time.

SUMMARY

A method is described in which a central test system tests enterprise applications at different levels of granularity. For example, in one embodiment, the recording of test data and the replay of test data occurs within the presentation layer rather than at the user interface layer (as in prior test systems). Specifically, in one embodiment, a user interface is provided for entering data and triggering one or more actions to process the data. The data and/or actions are translated to a presentation layer format and stored in the presentation layer format within a test script. The test script may then be used to test the application(s) directly at the presentation layer.

BRIEF DESCRIPTION OF THE DRAWINGS

A better understanding of the present invention can be obtained from the following detailed description in conjunction with the following drawings, in which:

FIG. 8 illustrates results of a selected user action displayed within an exemplary GUI.

DETAILED DESCRIPTION OF PREFERRED EMBODIMENTS

Described below is a system and method for testing applications at the presentation layer. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Embodiments of the Invention

To overcome the limitations of prior software testing systems, in one embodiment of the invention, test scripts are generated at a level of abstraction outside of the graphical user interface. In one particular implementation, this level of abstraction is the "presentation" layer within a multi-tiered enterprise system architecture. Even more specifically, in one embodiment, the presentation layer is enabled using Web Dynpro™ technologies designed by SAP AG, the assignee of the present application. It should be noted, however, that the underlying principles of the invention are not limited to any particular presentation-level technologies.

Figure 1A:
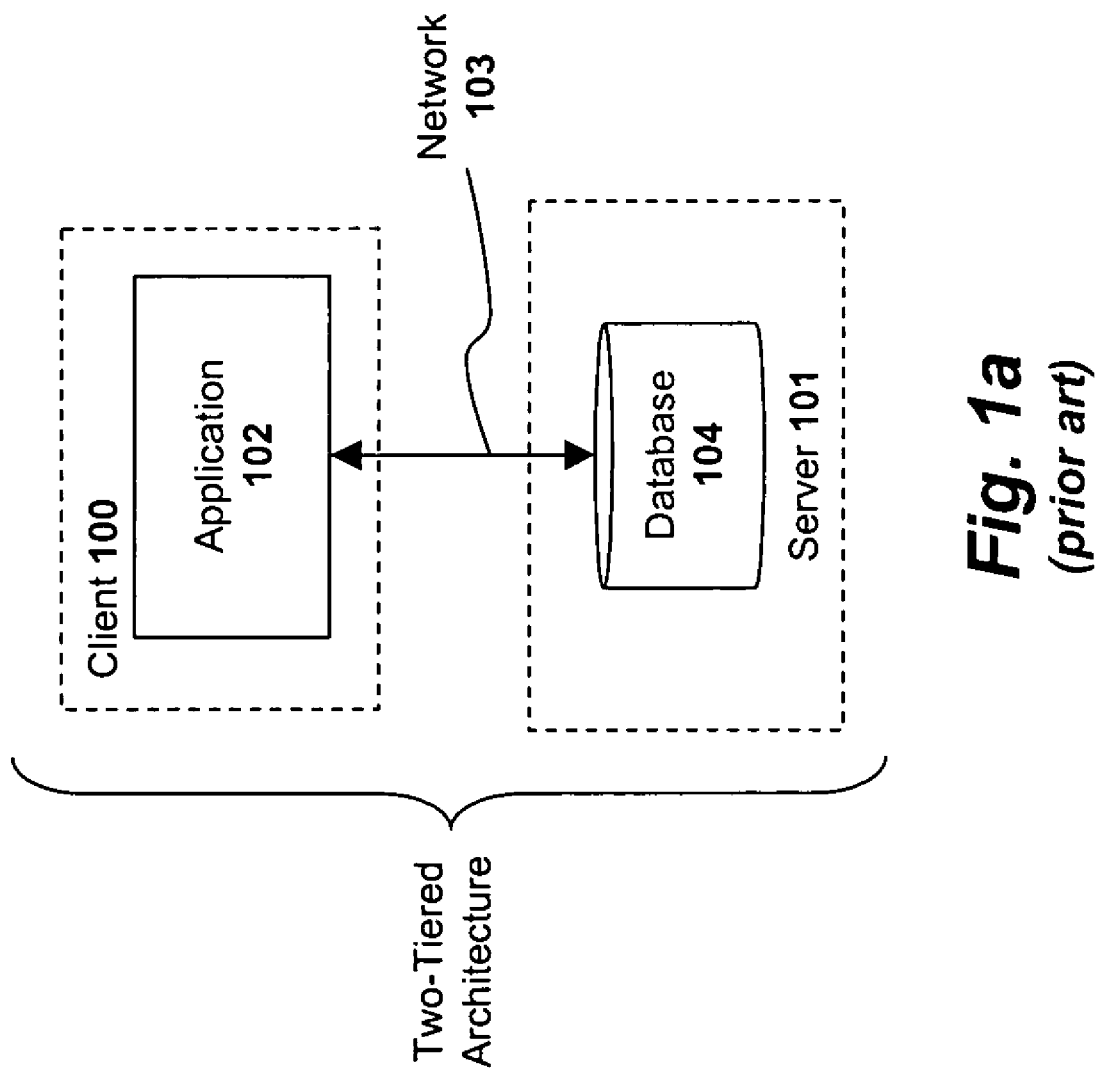
FIG. 1a illustrates a traditional two-tier client-server architecture.
Figure 1B:
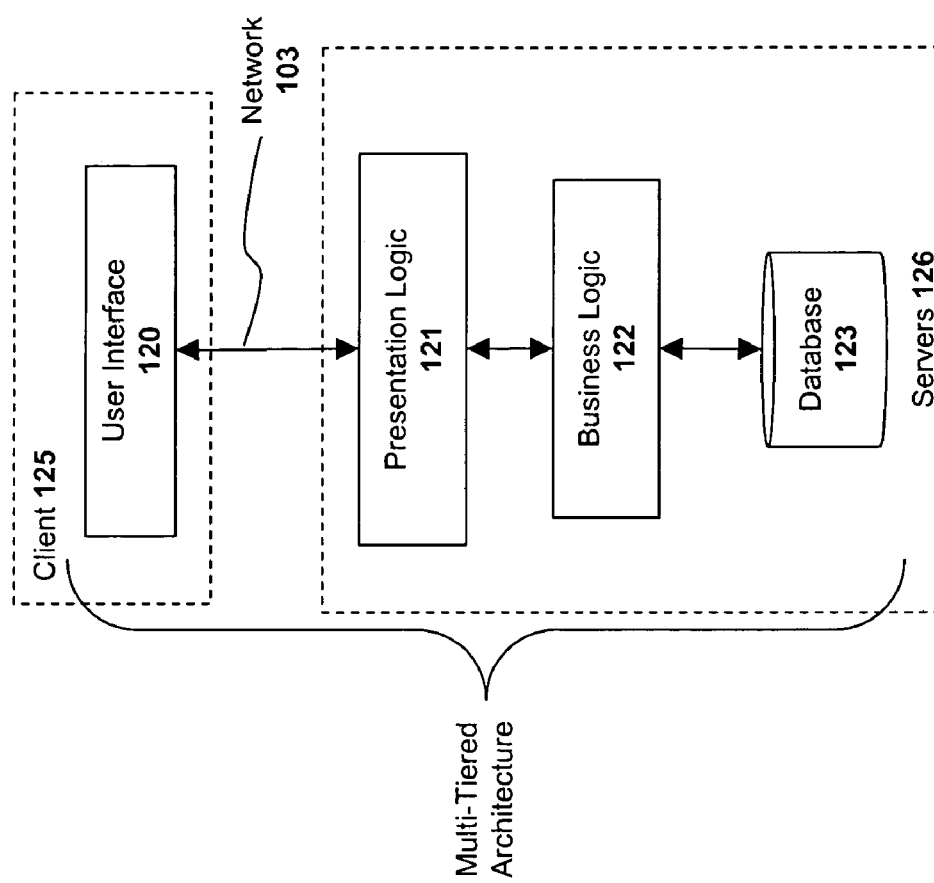
FIG. 1b illustrates a multi-tier client-server architecture.
Figure 1C:
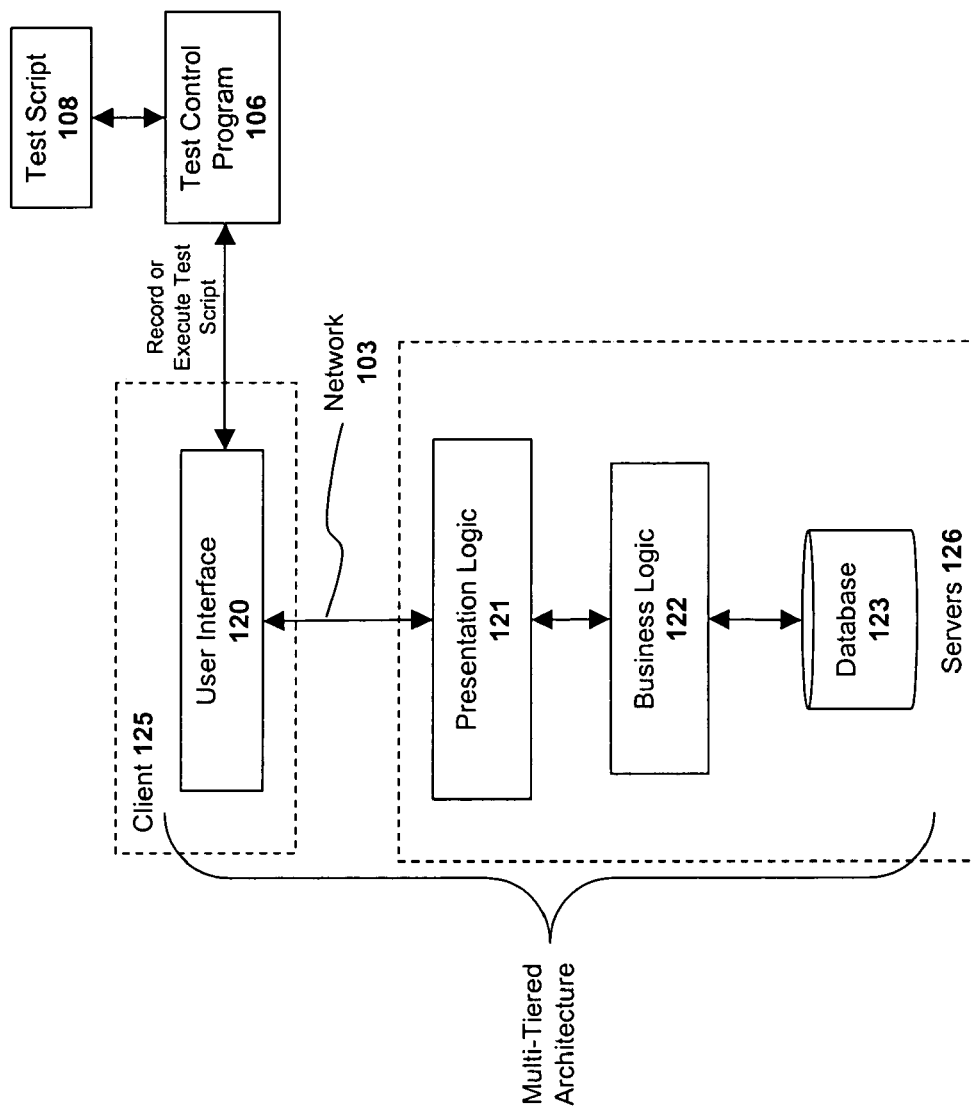
FIG. 1c illustrates a test control program for executing a test script at the user interface level of the multi-tier architecture.
Figure 2:
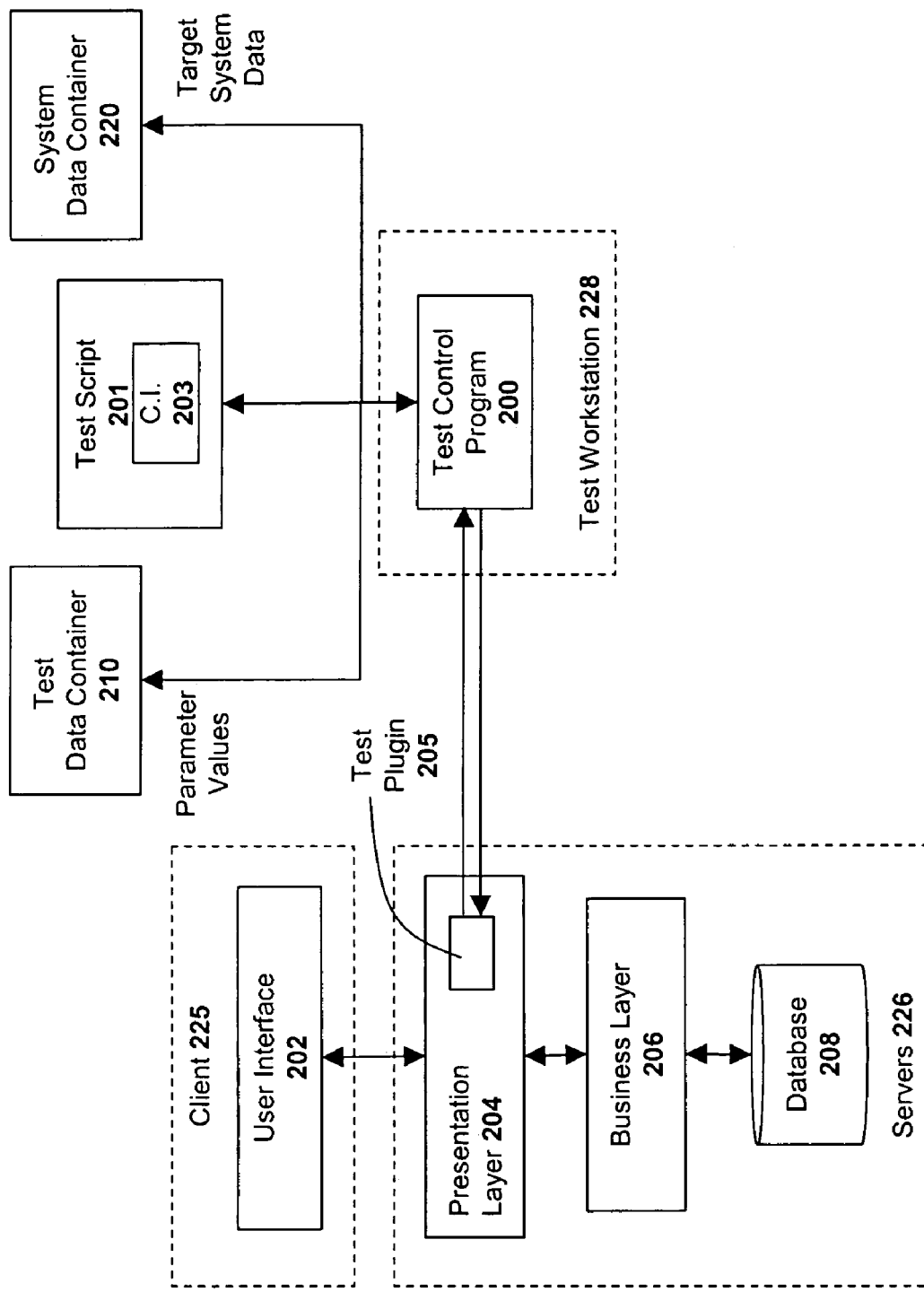
FIG. 2 illustrates an architecture for a test system according to one embodiment of the invention.

FIG. 2 illustrates an exemplary system architecture for recording and replaying test scripts in accordance with the embodiments of the invention described herein. The "application" to be tested includes a presentation layer component 204, a business layer component 206, and a database component 208 implemented across one or more servers 226. Unlike prior test systems, the user interface component 202 of the application, which may be implemented on one or more client computers 225, is not the layer at which recording and replaying test scripts occurs. Rather, in this embodiment of the invention, recording and replaying of test scripts occurs at the presentation layer 204.

As mentioned above, testing of applications involves both a recording phase and replay phase. During the recording phase known inputs are provided to the presentation layer 204 of the multi-tier architecture to establish what the predicted proper outputs should be. The inputs may be provided by invoking the application to be tested from a test workstation 228 and/or from a client computer 225. The presentation layer inputs and associated outputs are then forwarded by a test plugin 205 to a test control program 200 executed on the test workstation 228. Although illustrated within the presentation layer 204 in FIG. 2, the test plugin 205 may be a separate, independent functional module executed on at least one of servers 226. In one embodiment, the test plugin 205 is executed on the same server on which the presentation layer 204 resides.

The test control program 200 records the inputs and outputs provided by the test plugin 205 to a test script 201. In one embodiment, the inputs and outputs are recorded within a test data container 210, rather than directly within the test script itself. The test script 201 of this embodiment includes a command interface 203 that identifies the particular set or sets of test data within the test data container 210 to be used for a given test. The command interface 203 may be configured by a test designer based on the requirements for each test. Using command interfaces within a test script in this manner reduces repetitive listing of test data and parameters and condenses the test scripts into manageable sizes. In addition, command interfaces may be reused in the test script to improve the efficiency of creating and editing test scripts. Over testing periods, trends may emerge which repetitively use similar command interfaces that may be accessed from a library and not recreated for testing future application functions.

Information related to different computer systems on which the applications to be tested are executed may be stored within a system data container 220. When the test script 201 is executed, the test control program 200 identifies the various different platforms by extracting the appropriate information from the system data container 220.

Once a test script 201 is recorded, the test control program 200 may utilize the test script 201 to test another instance of the presentation layer 204 by applying the same inputs to the presentation layer 204 and comparing the resultant outputs to the predicted outputs (e.g., extracting an appropriate set of test data from the test data container 210 and identifying computer systems using the system data container 220).

Recording a Test Script

Figure 3:
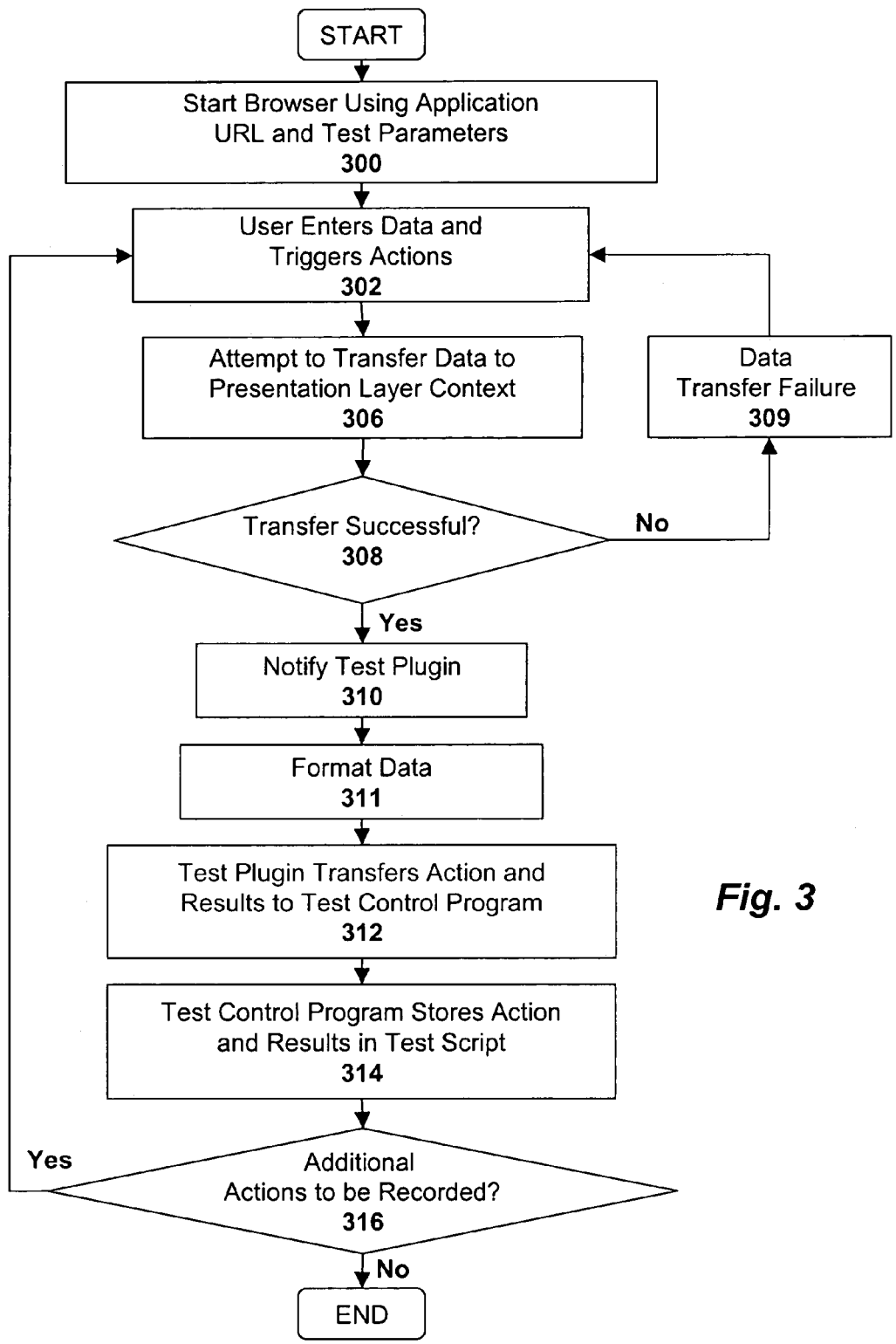
FIG. 3 illustrates a method for recording a test script according to one embodiment of the invention.
Figure 4:
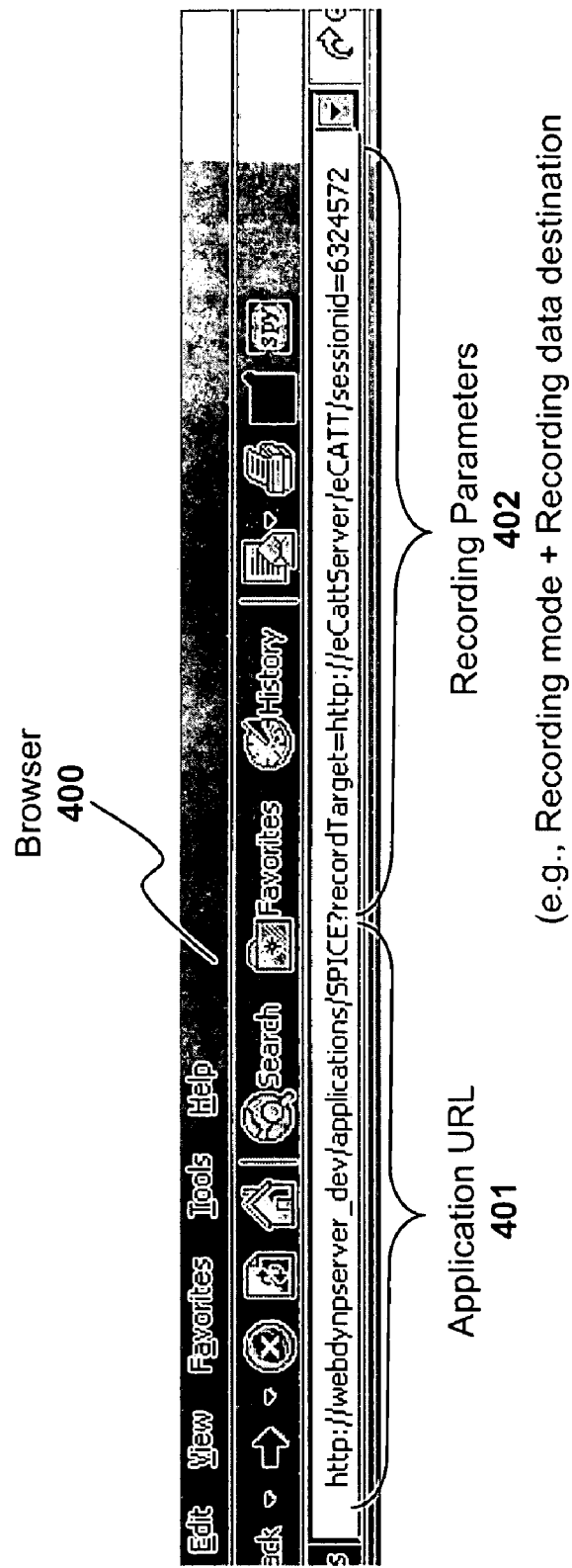
FIG. 4 illustrates a technique for invoking a test system recording mode within a browser.

One embodiment of a process for recording a test script is outlined in FIG. 3. At 300, a user interface such as a browser is started from the test workstation 228 or a client computer 225 using the uniform resource locator ("URL") of the application to be tested. The "application" to be tested includes both presentation logic 204 and business logic 206 executed on servers 226. As illustrated in FIG. 4, in one embodiment, the test control program 200 starts the browser 400 with both the URL 401 of the application to be tested (e.g., http://webdynpserver_dev/applications/SPICE) and additional recording parameters 402 (e.g., recordTarget=http://eCattServer/ eCatt/sessionid=6324572) which activate the test plugin 205 on the servers 226. The additional recording parameters 402 also identify a recording mode and/or provide a target destination for the recorded data (e.g., a location on the test workstation 228). Once activated, the test plugin 205 forwards input/output test data to the test control program 200, as described in greater detail below.

Figure 5:
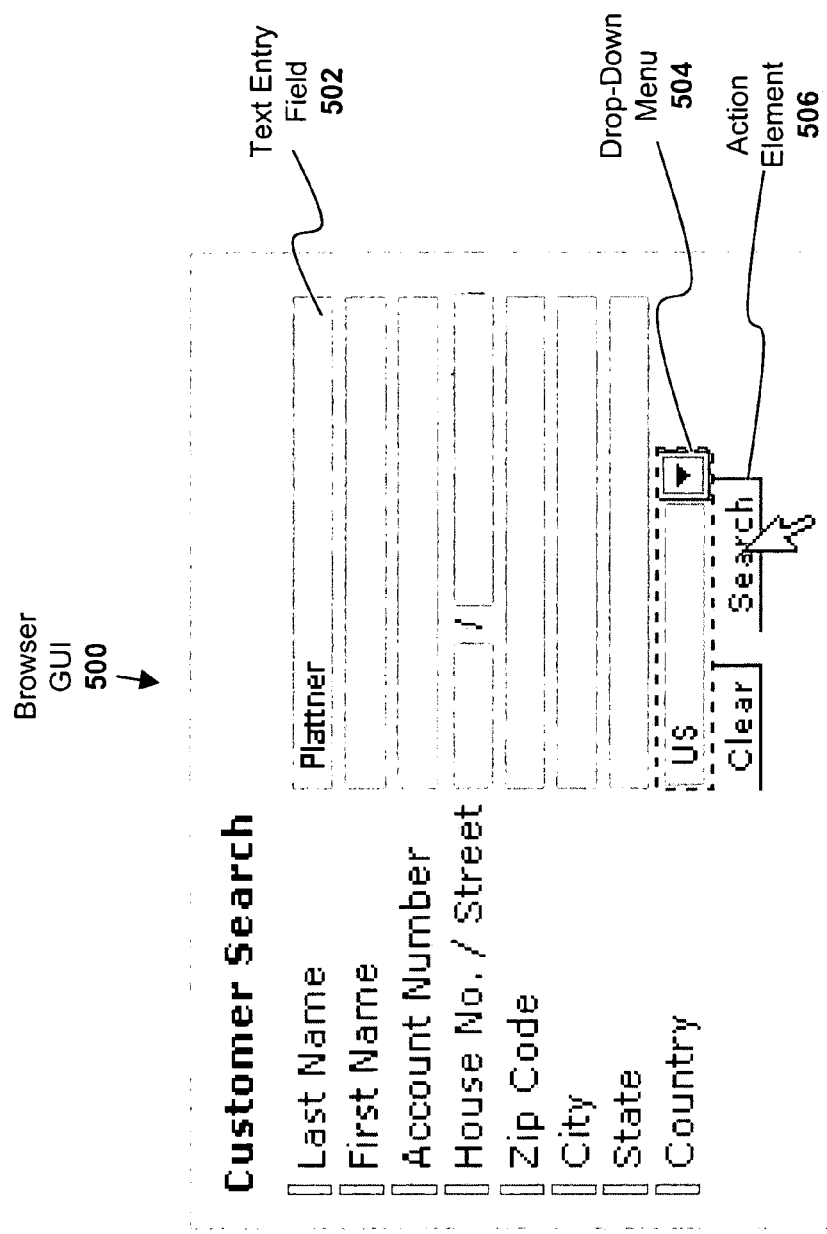
FIG. 5 illustrates an exemplary GUI in which a user enters text, selects elements, and triggers actions.

At 302 (FIG. 3), the user enters data and triggers actions as if the application were operating in "normal" mode (i.e., in a non-recording mode). By way of example, as illustrated in FIG. 5, within the browser GUI 500, the user may enter text within a text entry field 502 (e.g., the last name "Plattner") and may select an element from a drop down menu 504 (e.g., the country designation "US"). The user may then cause the application to process the entered data in a variety of ways by selecting one or more action elements 506 on the browser GUI. In the specific example shown in FIG. 5, the user selects a "search" button 506, thereby triggering a search for a particular contact within a contacts database (e.g., with a last name of "Plattner" located in the "US").

Figure 6:
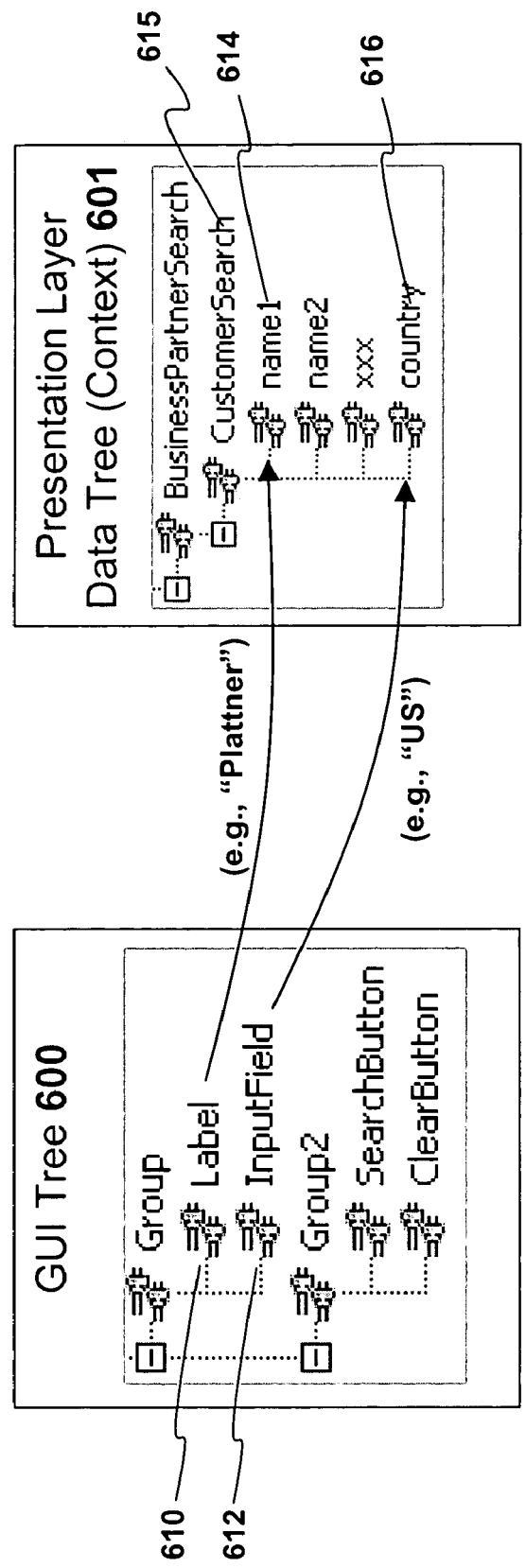
FIG. 6 illustrates a mapping of data between a user interface layer and a presentation layer according to one embodiment of the invention.

Returning to the flowchart of FIG. 3, at 306, an attempt is made to transfer the data entered by the user from the user interface layer 500 to the proper context within the presentation layer 204. This transfer is graphically illustrated in FIG. 6, which shows how data represented within a user interface data tree 600 is mapped to a data tree 601 within the presentation layer. Specifically, returning to the previous example, the text string "Plattner" associated with the generic user interface identifier "Label" 610 is transferred to the presentation layer data tree 601 where it is associated with the identifier "Name 1" 614 under the "Customer Search" subheading 615. Similarly, the drop-down menu item "US" associated with the generic user interface identifier "Input Field" 612 is transferred to the presentation layer data tree 601 where it is associated with the identifier "Country" 616, also under the "Customer Search" subheading. Thus, data associated with various generic technical elements of the browser GUI are transferred to more logical, human-readable data elements within the presentation layer.

At 308, a determination is made as to whether the transfer to the presentation layer was successful. This may fail due to formal issues such as, for example, the date "2002/34/34" was entered in a date field, or due to other checks in the application logic. If the data transfer fails (at 309) then the flow will revert back to 302 and the user will again have the opportunity to enter data within the user interface of the browser.

If the transfer is successful then, at 310, the test plugin 205 is notified. At 311, the test data may be formatted as described below with respect to FIG. 7. The test plugin 205 then transfers the data, the action and the results to the test control program at 312. In one embodiment, each time the user enters data and triggers an action, the data, the action and the results are grouped together and transmitted by the test plugin 205. In one embodiment, all communication between the test plugin 205 and the test control program 200 occurs via the HyperText Transport Protocol ("HTTP"). For example, the test data and actions are provided to the presentation layer 204 via an HTTP request (e.g., from the test control program 200) and the results are communicated from the test plugin 205 to the test control program 200 in the form of an HTTP response. It should be noted, however, that various different communication protocols may be employed to support communication between the test control program 200 and the test plugin 205 while still complying with the underlying principles of the invention.

Once received by the test control program 200, the action, the data entered by the user, and the results are recorded within the test script 201 at 314. If additional actions are to be recorded, determined at 316, then the recording process starts again from 302. If no additional actions are to be recorded, then the process ends.

The user who initiated the recording process (e.g., using recording mode parameters such as those illustrated in FIG. 4) may, at any time during process illustrated in FIG. 3, terminate the process (e.g., via a "Stop Recording" function), even if the recorded test script includes additional functions and/or test screens. Early termination may be performed, for example, if testing is limited to certain designated portions of the of the application.

Figure 7:
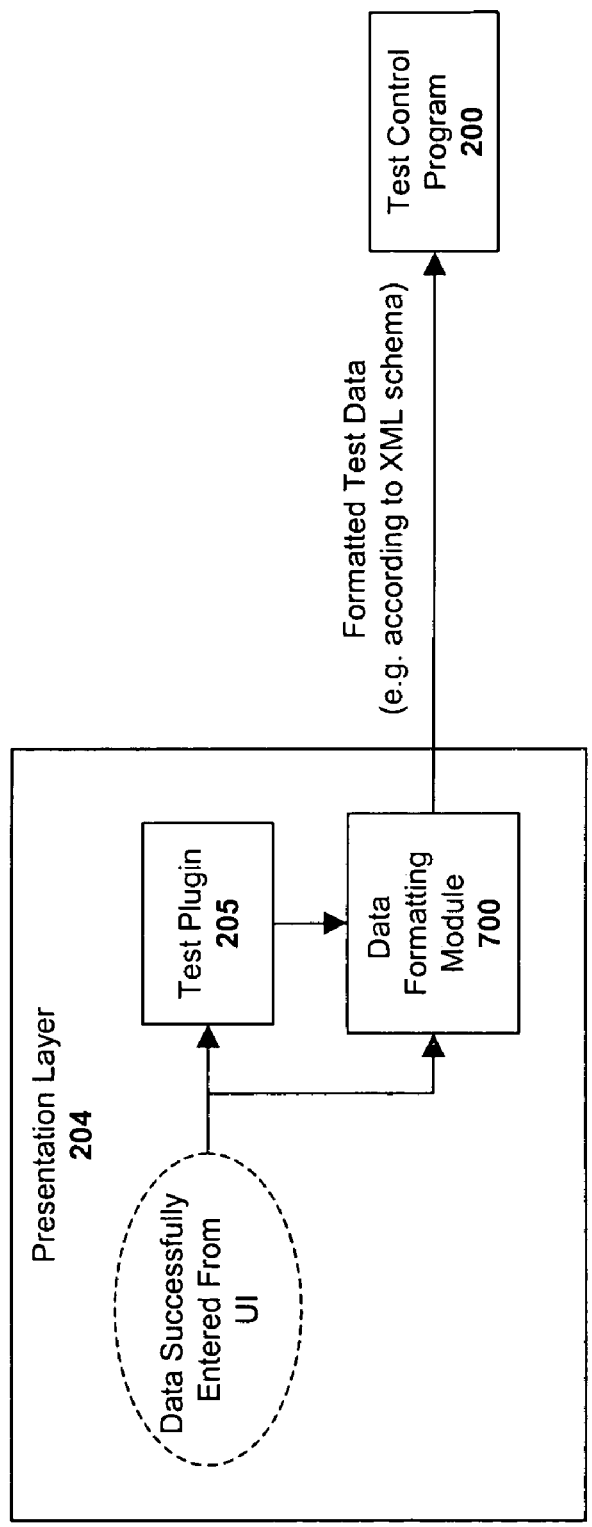
FIG. 7 illustrates a data formatting module for formatting test data according to one embodiment of the invention.

In one embodiment of the invention, test scripts are stored in a location and language-independent format. Once stored in a location-neutral format, the same test data may used to test applications designed for different locations/languages. By way of example, in a field which requires the entry of a date, a German user may enter the date in the format "18 Oct. 2002" whereas, for the same date, an American user may enter "Oct. 18, 2002." As illustrated in FIG. 7, one embodiment of the invention includes a data formatting module 700 which converts recorded location/language-dependent test data into a standard, location/language-neutral format (at 311 in FIG. 3).

In one embodiment, an XML Schema is used to define the locale and/or language-neutral manner of describing the data. Thus, either before or after the test plugin 205 is notified, the data formatting module 700 converts the recorded values to the XML schema-compatible values. The WebDynpro technologies mentioned above are equipped with a built-in XML client component for processing data based on an XML schema. Accordingly, in one embodiment of the invention, this XML client component is also used as the data formatting module 700 illustrated in FIG. 7 (e.g., to convert the test data to XML schema-compatible values). During the replay process (described below) the data formatting module 700 converts the XML schema-compatible format back to the location/language-specific format.

Information related to one embodiment of the XML schema can be found at "http://www.w3.org/XML/Schema." Returning to the German/American date example given above, using the XML schema date type defined at "http://www.w3.org/TR/xmlschema-2/#date" results in a date format of "2002-10-18".

Figure 8:
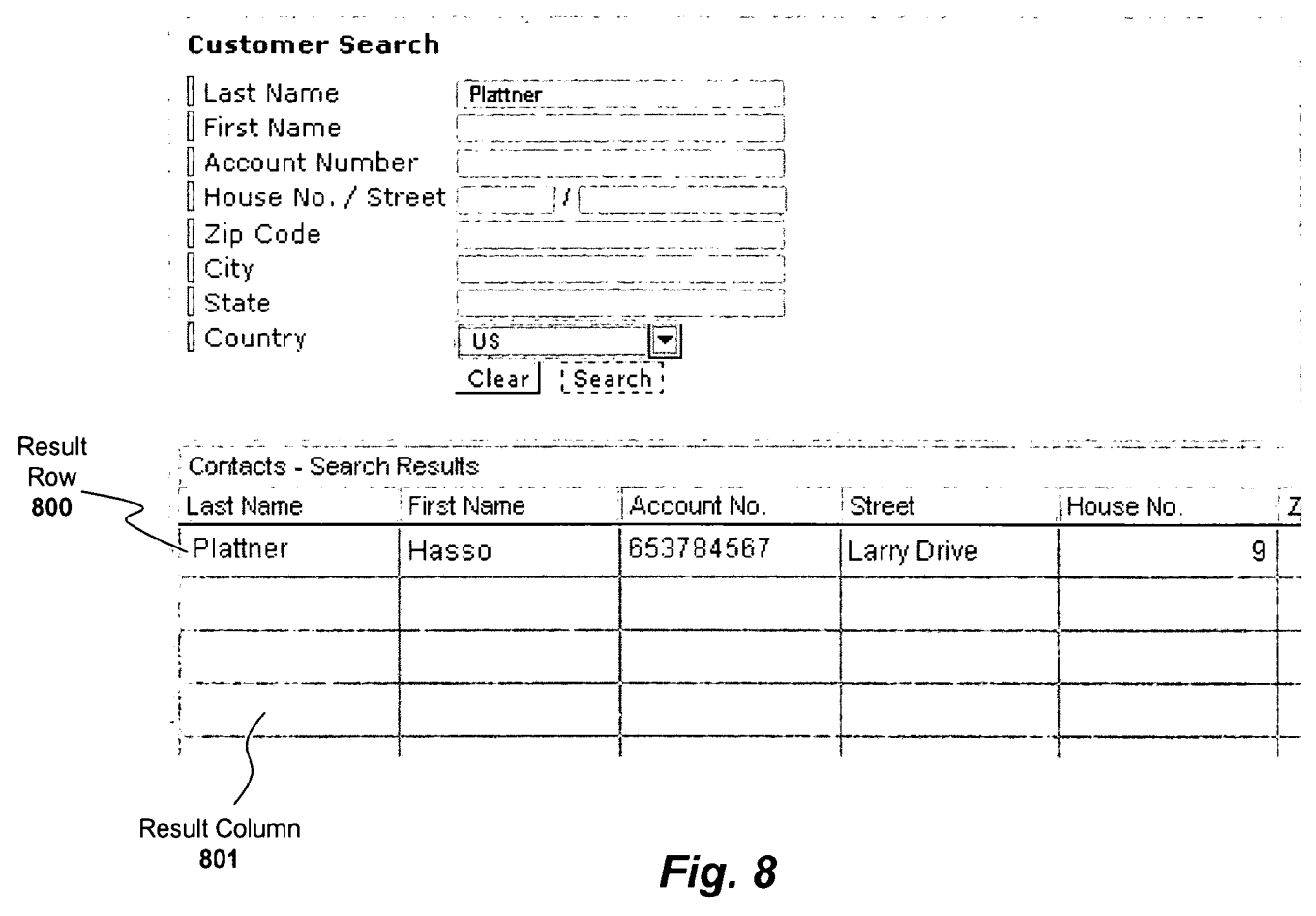

Although this application focuses on testing outside of the user interface layer, user interface data may be collected to supplement and/or perform checks on the test data collected from other layers. For example, checks during replay of the test script 201 may be performed with the supplemental user interface information. By way of example, as illustrated in FIG. 8, the name "Plattner" is entered on the field "Name" and after the "Search" button is pressed, the name "Plattner" appears on the first row 800 of result column 801 in the result view. During subsequent editing of the script, the script developer may write checks based on this user interface data such as, for example:

if (!queryResult.getLine(1).getField("name").equals ("Plattner") setScriptFailed( );

Replaying a Test Script

Figure 9:
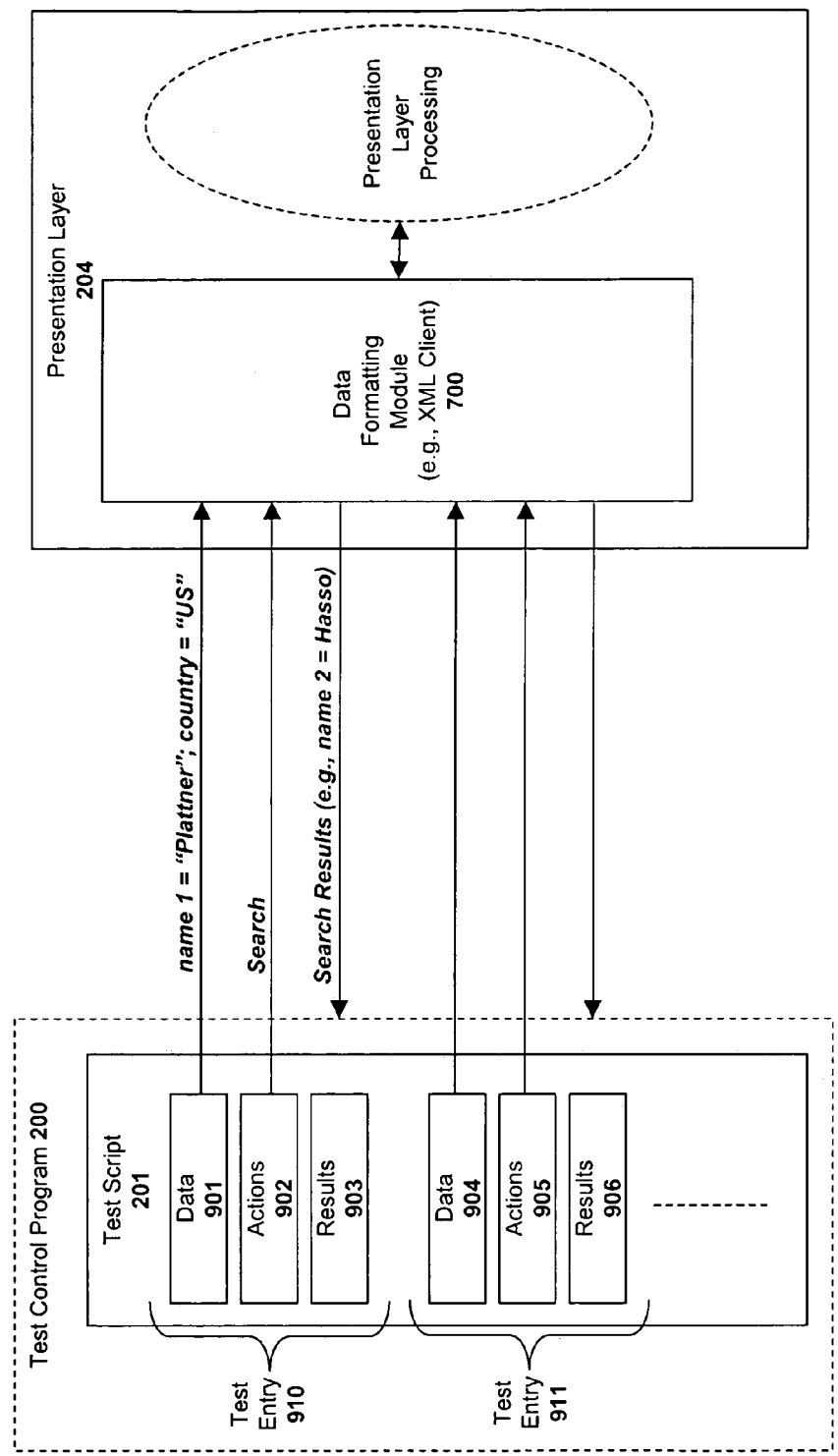
FIG. 9 illustrates a system for replaying a test script according to one embodiment of the invention.

As illustrated in FIG. 9, a script that is ready to be replayed consists of a series of test entries 910, 911, each of which is comprised of input data 901, 904; the actions 902, 905 which operate on the input data; and the results 903, 906 of the actions. As mentioned above, during replay of the test script 201, the test data may be retrieved from one or more test data containers 210 via a command interface 203, and information related to the computer systems on which reside the applications to be tested (e.g., the computer system addresses) may be extracted from a system data container 220.

Figure 10:
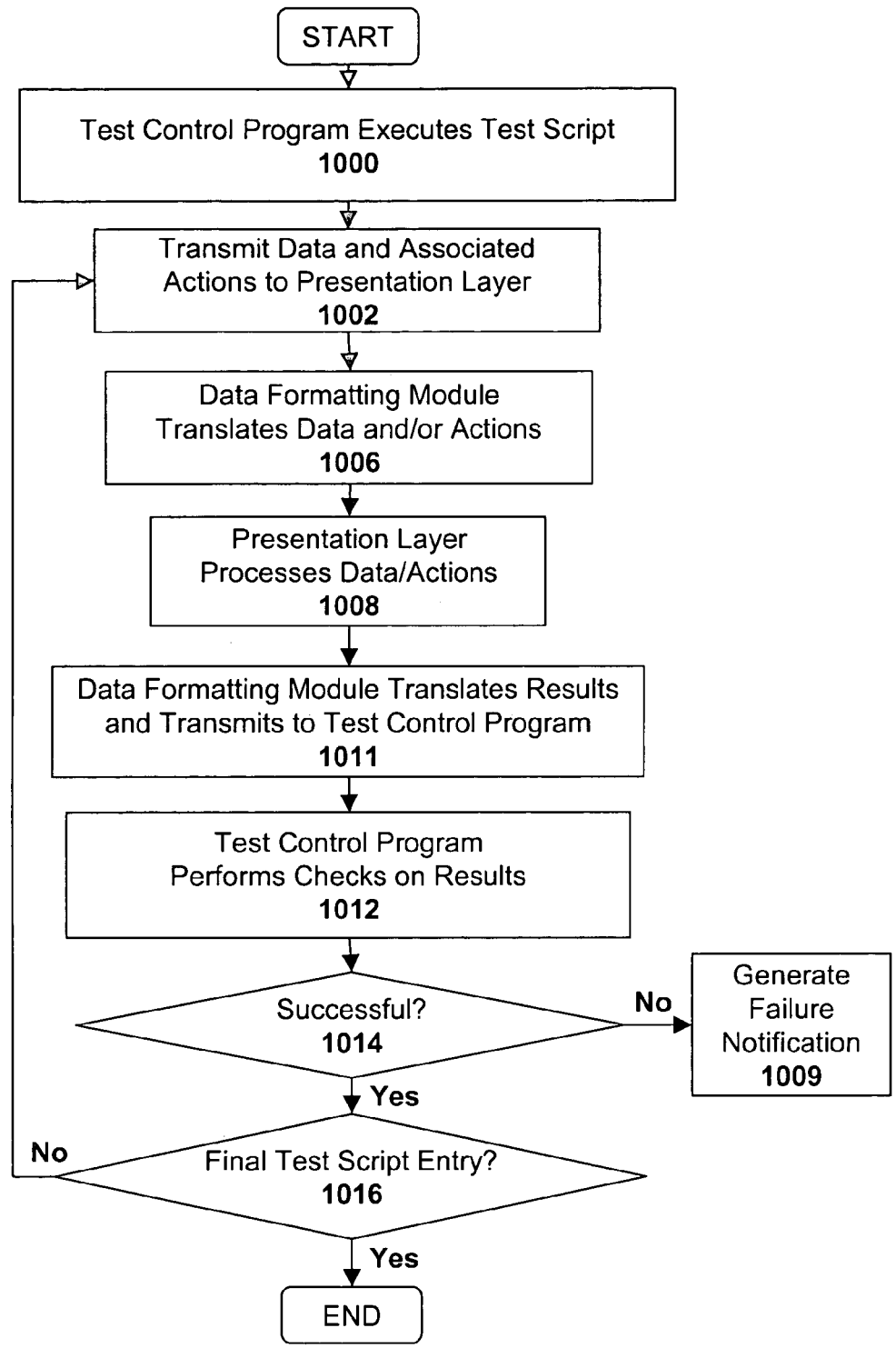
FIG. 10 illustrates a method for replaying a test script according to one embodiment of the invention.

FIG. 10 illustrates one embodiment of a method for replaying a test script using the system illustrated in FIG. 9. At 1000 the test control program 200 begins the testing process using the test script 201. At 1002, the data 901 and associated actions 902 for the first test script entry 910 are transmitted to the presentation layer 204 of the system under test, which may be identified via the system data container 220. At 1006, if the test data was previously formatted in a location/language-neutral manner (e.g., using an XML schema as described above) then the data formatting module 700 (e.g., the WebDynpro XML client) translates the test data so that it may be properly interpreted within the presentation layer. At 1008, the presentation layer 204 performs the specified actions on the data (e.g., search using "Plattner" as the last name and "US" as the country).

At 1011, the results of the specified actions are then provided to the data formatting module 700 which formats the results in a location/language-neutral manner (e.g., using the XML schema). The data formatting module 700 provides the formatted data to the test control program 200 which, at 1012, compares the results with the results 903 stored during the recording phase. If the results do not match, determined at 1014, then a test failure notification is generated at 1009. If the results match, then the next test script entry is processed at 1002, if one exists (determined at 1016). If no additional test script entries exist, then the replay process terminates.

As mentioned above, in one embodiment, communication between the test control program 200 and the presentation layer 204 and/or the business layer is based on an HTTP request/response protocol. Thus, during replay, the test control program 200 transmits the data 901 and associated actions 902 for each test entry 910 in the form of an HTTP request directed to the presentation layer 204 (or, more specifically, to the data formatting module 700, if formatting is required). Following processing, the results are then transmitted from the presentation layer 204 to the test control program 200 in the form of an HTTP response. Once again, however, the invention is not limited to a particular communication protocol.

In one embodiment, the multi-tiered architecture described herein (see, e.g., FIG. 2) may be implemented using a variety of different application technologies at each of the layers of the multi-tier architecture, including those based on the Java 2 Enterprise Edition™ (J2EE) standard, the Microsoft NET standard and/or the Advanced Business Application Programming ("ABAP") standard developed by SAP AG. For example, in a J2EE environment, the business layer 206, which handles the core business logic of the application, is comprised of Enterprise Java Bean (EJB) components with support for EJB containers. Within a J2EE environment, the presentation layer 204 is responsible for generating servlets and Java Server Pages (JSP) interpretable by different types of browsers at the user interface layer 202. Of course, the embodiments of the invention described herein may be implemented in the context of various different types of software platforms.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, Flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, although the embodiments of the invention described above focus on a specific set of data and associated actions (i.e., the text entry of "Plattner" for a name, the selection of "US" as a country, and the generation of a contact search), the underlying principles of the invention may be employed using a virtually unlimited number of different types of input data and associated actions. Moreover, although the format used to represent the location/language-neutral test data described above is based on an XML schema, various other data formats may be employed. Finally, although the test control program 200 described above is illustrated on a dedicated workstation 228, the test control program may be executed on various different computer platforms and in various different network environments while still complying with the underlying principles of the invention.

Accordingly, the scope and spirit of the invention should be judged in terms of the claims which follow.

What is claimed is:

1. A method for recording a test script comprising:
providing a user interface for entering data and triggering one or more actions to process the data;
translating the data and/or actions to a presentation layer format;
receiving results of the data and/or actions in a presentation layer format; and
storing the entered data, actions and/or results in the presentation layer format within a test script, the test script usable to test an instance of an application at a presentation layer of the application.

2. The method as in claim 1 further comprising:
converting the presentation layer formatted data, actions and/or results into a location and/or language-neutral format prior to storing.

3. The method as in claim 2 wherein the location and/or language-neutral format is based on a predefined XML schema.

4. The method as in claim 1 further comprising:
providing the translated data and/or actions to a business layer, the business layer processing the data and/or actions according to predefined business logic, generating the results of the data and/or actions, and providing the results to the presentation layer, the presentation layer generating the presentation layer format for the results of the data and/or actions.

5. The method as in claim 1 further comprising:
storing the entered data within a test data container rather than directly within the test script, the entered data accessible while testing the instance of the application via a command interface of the test script.

6. The method as in claim 1 wherein the user interface comprises a browser, the method further comprising:
initializing the browser with a uniform resource locator ("URL"), the URL having a first component identifying an application from which the test script is to be recorded and a second component specifying parameters for recording of the test script.

7. The method as in claim 6 wherein one of the parameters comprises a location where said test script is to be stored.

8. The method as in claim 1 further comprising:
storing data related to the user interface, the data related to the user interface usable to perform checks on the presentation level data.

9. A method for testing an application comprising:
transmitting a series of presentation layer data and associated actions to an instance of a presentation layer of an application, the application processing the test data and associated actions;
receiving presentation layer results of the associated actions; and
comparing the presentation layer results to recorded presentation layer results to determine whether the application is functioning properly.

10. The method as in claim 9 further comprising:
formatting the presentation layer data and/or associated actions in a location/language-neutral format prior to providing the presentation layer data to the instance of the presentation layer.

11. The method as in claim 10 wherein the location/language-neutral format is defined by an XML schema.

12. The method as in claim 10 further comprising:
formatting the presentation layer results in a location/language-neutral manner.

13. The method as in claim 9 further comprising:
reading the series of presentation layer data and associated actions from a test script stored on a test workstation.

14. The method as in claim 9 further comprising:
receiving user interface data associated with the presentation layer results; and
comparing the user interface data to recorded user interface data to ensure that the application is functioning properly.

15. A test system comprising:
a user interface to receive data and an indication of one or more actions to process the data;
a presentation layer to translate the data and/or actions to a presentation layer format;
a test application program to receive results of the data and/or actions in a presentation layer format and to transfer the data, actions and/or results of the data and actions to a test control program;
a test script to store the entered data, actions and/or results in the presentation layer format, the test script usable to test an instance of an application within the presentation layer of the application.

16. The system as in claim 15 further comprising:
a conversion module to convert the data, actions and/or results into a location and/or language-neutral format prior to storing.

17. The system as in claim 16 wherein the location and/or language-neutral format is based on a predefined XML schema.

18. The system as in claim 15 further comprising:
a business layer to process the data and/or actions according to predefined business logic, to generate the results of the data and/or actions, and to provide the results to the presentation layer, the presentation layer generating the presentation layer format for the results of the data and/or actions.

19. The system as in claim 15 further comprising:
a test data container to store the entered data, the entered data accessible while testing the instance of the application via a command interface of the test script.

20. The system as in claim 15 further comprising:
a browser initialized with a uniform resource locator ("URL"), the URL having a first component identifying an application from which the test script is to be recorded and a second component specifying parameters for recording of the test script.

21. The system as in claim 20 wherein one of the parameters comprises a location on a network where said test script is to be stored.

22. The system as in claim 15 further comprising:
a storage area to store data related to the user interface, the data related to the user interface usable to perform checks on the presentation level data.

23. An article of manufacture including program code which, when executed by a processor, cause the processor to perform the operations of:
providing a user interface for entering data and triggering one or more actions to process the data;
translating the data and/or actions to a presentation layer format;
receiving results of the data and/or actions in a presentation layer format; and
storing the entered data, actions and/or results in the presentation layer format within a test script, the test script usable to test an instance of an application at the presentation layer of the application.

24. The article of manufacture as in claim 23 further comprising program code to cause said processor to perform the operations of:
converting the data, actions and/or results into a location and/or language-neutral format prior to storing.

25. The article of manufacture as in claim 24 wherein the location and/or language-neutral format is based on a predefined XML schema.

26. The article of manufacture as in claim 23 further comprising program code to cause said processor to perform the operations of:
providing the translated data and/or actions to a business layer, the business layer processing the data and/or actions according to predefined business logic, generating the results of the data and/or actions, and providing the results to the presentation layer, the presentation layer generating the presentation layer format for the results of the data and/or actions.

27. The article of manufacture as in claim 23 further comprising program code to cause said processor to perform the operations of:
storing the entered data within a test data container, the entered data accessible while testing the instance of the application via a command interface of the test script.

28. The article of manufacture as in claim 23 wherein the user interface comprises a browser, the article of manufacture further comprising program code to cause said processor to perform the operations of:
initializing the browser with a uniform resource locator ("URL"), the URL having a first component identifying an application from which the test script is to be recorded and a second component specifying parameters for recording of the test script.

29. The article of manufacture as in claim 28 wherein one of the parameters comprises a location on a network where said test script is to be stored.

30. The article of manufacture as in claim 23 further comprising program code to cause said processor to perform the operations of:
storing data related to the user interface, the data related to the user interface usable to perform checks on the presentation level data.

* * * * *